(12) United States Patent
Rogitz

(10) Patent No.: US 7,400,288 B2
(45) Date of Patent: Jul. 15, 2008

(54) TARGET VISUALIZATION SYSTEM

(76) Inventor: John L. Rogitz, 750 B St., Suite 3120, San Diego, CA (US) 92101

( * ) Notice: Subject to any disclaimer, the term of this patent is extended or adjusted under 35 U.S.C. 154(b) by 0 days.

(21) Appl. No.: 11/487,859

(22) Filed: Jul. 15, 2006

(65) Prior Publication Data
US 2008/0013080 A1 Jan. 17, 2008

(51) Int. Cl.
G01S 13/00 (2006.01)
(52) U.S. Cl. .............. 342/52; 342/53; 342/54; 342/58; 356/5.02
(58) Field of Classification Search ............ 356/139.01; 342/52–54, 58
See application file for complete search history.

(56) References Cited
U.S. PATENT DOCUMENTS 4,811,374 A * 3/1989 Kasa et al. ................ 378/96
5,386,265 A * 1/1995 Sakamoto ................ 396/287
5,495,576 A * 2/1996 Ritchey .................... 345/420
2003/0120364 A1* 6/2003 Kirsch ........................ 700/56
2003/0168271 A1* 9/2003 Massen ..................... 180/167
2004/0021772 A1* 2/2004 Mitchell .................... 348/148
2005/0223308 A1* 10/2005 Gunn et al. ................ 715/500
2006/0197937 A1* 9/2006 Bamji et al. .............. 356/5.01
2007/0091609 A1* 4/2007 Solberg et al. ............ 362/287

FOREIGN PATENT DOCUMENTS
WO WO 0025089 A1 * 5/2000

* cited by examiner

Primary Examiner—Thomas H. Tarcza
Assistant Examiner—Timothy A Brainard
(74) Attorney, Agent, or Firm—John L. Rogitz

(57) ABSTRACT

A platform such as a car has a processor receiving information representing the location of the platform and a location of a target. An emitter assembly controlled by the processor produces a visual display outside of and beyond the platform that an occupant of the platform can see. The display is transmitted along the target bearing.

13 Claims, 1 Drawing Sheet

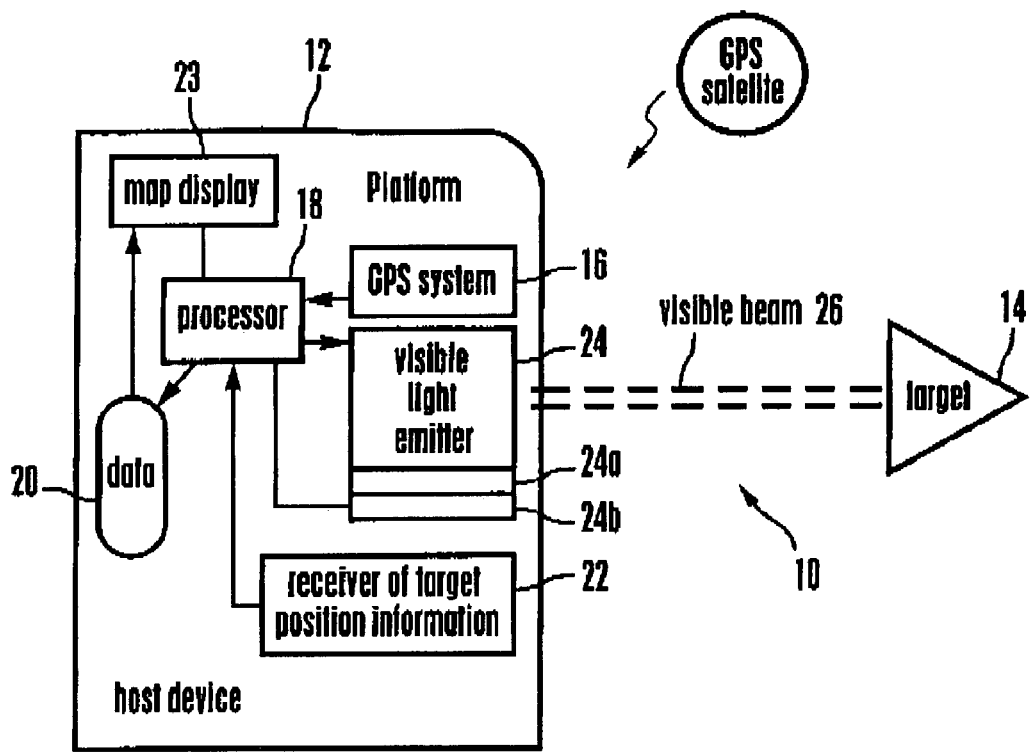
Figure 1
Figure 2
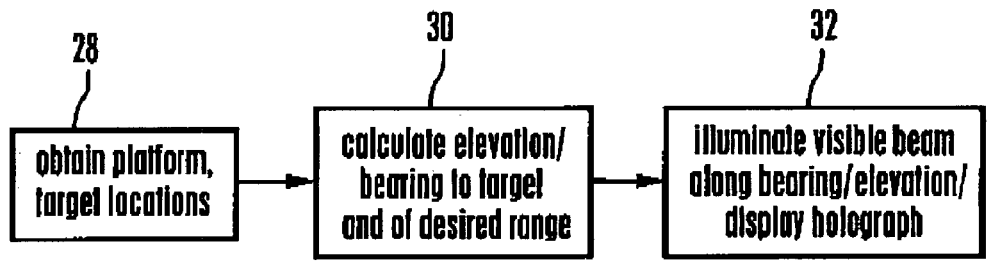

TARGET VISUALIZATION SYSTEM

FIELD OF THE INVENTION

The present invention relates generally to target visualization systems.

BACKGROUND

Vehicles may be provided with GPS-based maps that show an occupant a map. Directions might be provided, but the fact is that many people have trouble translating what they see on a two dimensional map in a car to their orientation in the three dimensional world. This invention ameliorates that problem.

SUMMARY OF THE INVENTION

A platform such as a vehicle or aircraft or water vessel has a processor receiving information representing the location of the platform and a location of a target, from which a target bearing is determined. An emitter assembly is controlled by the processor to produce a visual display outside of and beyond the platform that an occupant of the platform can see. The display is transmitted substantially along the bearing.

Target location may be received from an occupant of the vehicle. The visual display may be a light beam or a holographic image. The processor can determine at least a bearing from the platform to the target using the information, with a light beam being emitted along the bearing. Or, the processor can determine a range from the platform to the target using the information, with a holographic image being displayed at the range on the bearing.

In another aspect, a method includes determining at least a bearing from a platform to a target, and generating a beam of visible light toward the target from the platform so that an occupant of the platform can see in 3D space external to the platform an indication of the location of the target.

In still another aspect, a moving platform has a processor, a GPS receiver on the platform and receiving position signals representing the location of the vehicle on the Earth, and a source of target position information. An emitter assembly is mounted on the platform. The processor receives the position signals representing the location of the vehicle on the Earth and the target position information and derives at least an approximate target bearing therefrom. The emitter assembly is caused to transmit a visible light beam substantially along the approximate target bearing in 3D space.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system according to the invention; and FIG. 2 is a flow chart of non-limiting example logic for effecting the light beam.

DETAILED DESCRIPTION OF THE PREFERRED EMBODIMENT

Referring initially to FIG. 1, a system is shown, generally designated 10, which includes a platform 12 and a target 14, it being understood that more platforms/targets can be in the system. The platform 12 may be a vehicle, an aircraft, a vessel, or even a stationary platform. Likewise, the target 14 may be a vehicle, an aircraft, a vessel, or a stationary target such as a restaurant, theater, or other building to which the driver of the platform desires to go. Or indeed, at which the driver of the platform might wish to shoot, although the intended, albeit non-exclusive, application is to provide a visualization in 3D space external to a vehicle of the location of a place to which the driver of the vehicle wants to go.

The platform 12 can have a position receiver 16 such as a global position system (GPS) receiver to obtain the position of the platform 12. The position receiver 16 sends position signals to a processor 18 of the platform 12, which may access a database 20 containing computerized maps. If the platform is a vehicle the processor may be the engine control module (ECM). In some embodiments a receiver 22 of target position information sends target position information (and if desired target elevation) to the processor. The receiver 22 may be any suitable receiver, e.g., another GPS receiver, a cell phone receiving position information, a wireless computer receiving target position information, etc. The target position information may be received from the target itself, which can cooperatively transmit it to the platform 12, or it can be received from an external source, e.g., a radar sensing station or other source. When the target 14 is stationary no target position receiver 22 need be provided. Instead, target 14 position may be accessed from the maps in the database 20. For instance, an occupant of the vehicle can touch the indicated location of a restaurant on a map display 23 that can be a touch screen showing the location of a restaurant to cause the position of the restaurant to be input to the processor 18 as target position.

The processor 18 executes the logic discussed below to activate a visible light beam emitter assembly 24 to transmit a visual light beam 26 toward the target 14. The emitter assembly 24 may include a laser that is mounted on a movable base 24a controlled by a servo-controller or other controller 24b on, e.g., the roof or front hood or bumper of a vehicle, so that it can rotate through many (preferably 360) degrees of bearing and if desired through many degrees of elevation. The processor 18 controls the controller 24b. Alternatively, since a driver a vehicle typically (at least, hopefully) gazes ahead, not behind, and since other cars might be following, the base 24a may only rotate through the forward 180 degrees relative to the heading of the vehicle. The emitter may be as simple as that in a hand-held pointer device which can send a light beam 26 along the bearing to the target without unduly interfering with other platforms/people.

In an alternate embodiment the emitter assembly 24 may be a non-moving array of emitters, with only the emitter oriented along the bearing determined below being energized in accordance with the logic herein. Combinations of the above may be used. In any case, the light beam 26 may be a beam of light per se or it may be a holographic image that is superimposed on the target 14. The light beam 26 may be elevated slightly, e.g., if zero degrees elevation represents the ground plane on which a vehicle is moving, then the light beam 26 may be transmitted slightly upward a few degrees to avoid impinging on nearby objects that are in the same plane as the platform 12.

Block 28 in FIG. 2 indicates that the locations of the platform 12 and target 14 are obtained as discussed above. Typically, the locations are in terms of latitude and longitude. At block 30, the processor 18 calculates the bearing from the platform 12 to the target 14 (and, if either one is airborne, the elevation angle as well if target altitude is provided.) Range may also be calculated to support the below-described holographic display. This calculation is easily done since both positions in latitude and longitude are known.

At block 32, the emitter assembly 24 is caused to produce the light beam 26 to the target 14 by moving the base 24a as appropriate or by energizing the proper one of plural emitters in an array. In one implementation, when the processor 18 has calculated the bearing, it may display, on for instance the map display 23, a message "visualization ready", and then an occupant of the platform might manipulate an input device (such as a steering wheel button or a touch screen button on the map display 23) to energize the emitter assembly 24 for as long as the occupant depresses the input device or for some predetermined time period, e.g., a few seconds.

The beam 26 may be a holographic image that is created by the emitter assembly 24 and superimposed onto the target 14 using the optional range determination discussed above, or both a beam per se terminating in a holographic image may be generated. It will be appreciated that what is produced is a visual display outside of and beyond the platform 12 that an occupant of the platform 12 can see, which extends toward and may even intersect the target 14 in 3D space.

The light beam 26 may be pulsed on and off if desired for a short time, e.g., a few seconds, and then terminated.

While the particular TARGET VISUALIZATION SYSTEM is herein shown and described in detail, it is to be understood that the subject matter which is encompassed by the present invention is limited only by the claims.

What is claimed is:

1. A motor vehicle, comprising:
   a processor receiving information representing the location of the vehicle and a location of a target, the processor determining therefrom at least a bearing from the vehicle to the target; and
   at least one emitter assembly controlled by the processor to produce a visual display outside of and beyond the vehicle that an occupant of the vehicle can see, the display being transmitted substantially along the bearing, the emitter assembly emitting the visual display only if the bearing is within a predetermined number of degrees relative to the heading of the vehicle and otherwise not emitting the visual display.

2. The vehicle of claim 1, wherein target location is received from an occupant of the vehicle.

3. The vehicle of claim 1, wherein the visual display is a light beam.

4. The vehicle of claim 1, wherein the visual display is a holographic image.

5. The vehicle of claim 1, wherein the display is pulsed on and off.

6. The vehicle of claim 1, wherein the processor determines a range from the vehicle to the target using the information, a holographic image being displayed substantially at the range, substantially on the bearing.

7. A method, comprising:
   determining at least a bearing from a platform to a target; and
   generating a beam of visible light toward the target from the platform so that an occupant of the platform can see in 3D space external to the platform an indication of the location of the target, wherein the beam of visible light is generated from a non-moving array of emitters, with only the emitter oriented along the bearing being energized.

8. A moving platform, comprising:
   at least one processor;
   at least one GPS receiver on the platform and receiving position signals representing the location of the platform on the Earth;
   at least one source of target position information; and
   at least one emitter assembly mounted on the platform, wherein
   the processor receives the position signals representing the location of the platform on the Earth and the target position information and derives at least an approximate target bearing therefrom, the emitter assembly being caused to transmit a visible light beam substantially along the approximate target bearing in 3D space, wherein when the processor has calculated the bearing, the processor displays a message indicating that visualization is ready prior to causing the emitter assembly to transmit the light beam, the processor causing the emitter assembly to transmit the beam on upon receipt of an occupant-generated signal to transmit the beam.

9. The platform of claim 8, wherein the platform is a motor vehicle.

10. The platform of claim 8, wherein the platform is a waterborne vessel.

11. The platform of claim 8, wherein the signal is generated by an occupant of the platform manipulating a button on a steering wheel of the platform.

12. The platform of claim 8, wherein the signal is generated by an occupant of the platform touching a screen.

13. The platform of claim 8, wherein the beam is emitted for as long as the occupant depresses an input device.

* * * * *